Patented Oct. 14, 1930

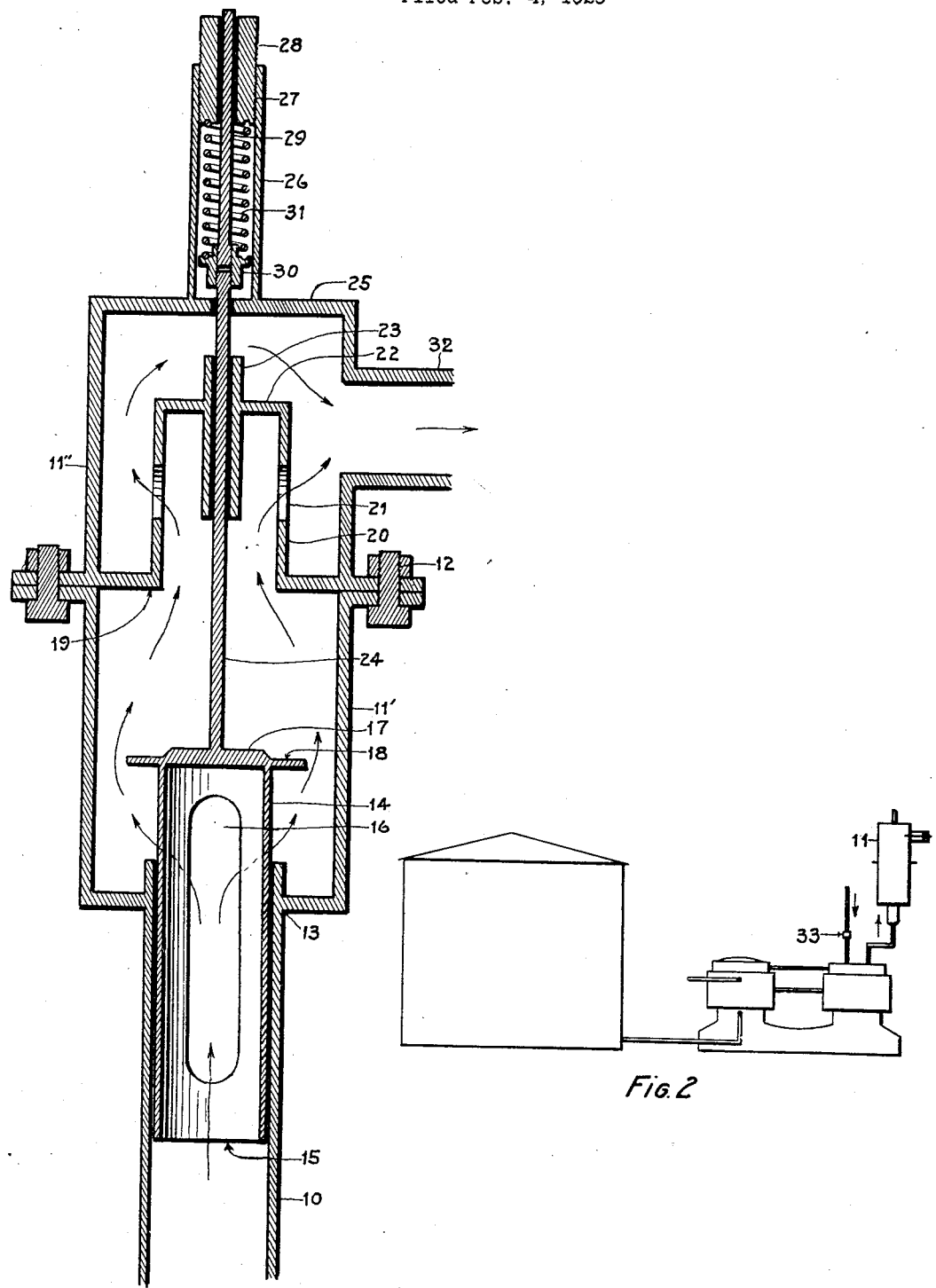

1,778,247

UNITED STATES PATENT OFFICE

HOWELL A. DENTON, OF TAFT, CALIFORNIA

SAFETY FIELD-PUMP STOP

Application filed February 4, 1929. Serial No. 337,389.

The object of my invention is to provide an automatic stop which will prevent the racing and destruction of unattended steam pumps.

A further object of my invention is to provide a stop of the general character named which may be adjusted to take care of any desired flow of steam, air or gas and to stop the pump should this predetermined flow rate be exceeded.

It is common practice in the fields where crude petroleum is produced to deliver the oil from the wells into small tanks known as field tanks. These slowly fill with oil from the well and at intervals the contents of each such tank are transferred to a storage or other larger tank by means of a pump, usually located close to the field tank. On a large lease these pumps are often widely scattered and as, for reasons of economy, relatively small individual pumps are used, a great deal of attention is required on the part of the pumper to watch the progress of the delivery from each tank and to see that the pump is shut down before the tank becomes completely empty. If this attention is not given and the tank is allowed to run dry while the pump is unattended and under full steam pressure the pump is likely to race so violently that it may damage or completely destroy itself before the pumper can reach it to shut off the steam supply.

The prime object of my invention is to stop the flow of steam through the pump as soon as it commences to run at a speed above its normal operating speed and to keep the supply shut off until, in the course of his regular rounds, the attendant reaches the particular pump and shuts off the steam at the throttle.

The manner in which I accomplish this end will be evident from the attached drawing illustrating a particular embodiment of my invention and the accompanying description thereof in which:

Fig. 1 shows a device embodying my invention in vertical section and

Fig. 2 shows diagrammatically the manner in which such a device may be applied to a field pump.

Referring to Fig. 1, 10 is a pipe which may be attached to or by an extension of the steam discharge of the pump. 11' and 11" are substantially cylindrical hollow bodies which may be castings or may be formed by welding and machining sheet metal, as may be preferred. The halves shown are fastened together by the bolts 12 and the lower half 11' is made fast to the pipe 10 at the point 13 by welding or otherwise as may be convenient.

The upper end of the pipe 10 should be bored or reamed to make it truly cylindrical and to give it a smooth inner surface and in this reamed portion is fitted the sliding valve 14, having an open lower end 15, one or more ports 16 and a cap member 17. This cap member should be extended to form a flange as at 18 and the upper side of this flange should be faced smooth and square.

The upper half 11" of the casing is formed with an internal flange 19, the inner portion of which is also faced smooth and square to afford a rest for the faced surface 18. Above this flange rises a tubular extension 20 having ports as at 21 and a cap member 22 in which is formed a guide 23.

The cap 17 has projecting from the central portion of its upper surface a rod or stem 24 which passes through the guide 23 and through the upper end 25 of the casing member 11". A tubular extension 26 of this upper member is threaded internally as at 27 and in this thread is inserted a long nut 28 having a squared end for use with a wrench or a T handle or other means of turning the same. This nut is drilled longitudinally to a neat sliding fit with the extension stem 29 which is joined to the stem 24 by the internally threaded nut 30, this nut being a loose fit in the tube 26. The open coil spring 31 bears on the top of nut 30 and on the bottom of nut 28 so that by adjusting the position of the latter the stem and with it the sliding valve 14 may be urged downwardly by a controllable spring pressure.

The operation of my device is as follows:

The exhaust from the pump passes upward through the pipe 10 and into the open end 15 of the sliding valve 14. Thence it passes through the port 16 into the interior of the case 11 through the ports 21 and thence to the atmosphere through a lateral extension 32 formed on the upper half of the case 11″.

The spring tension being properly adjusted the valve 14 will lift just far enough to allow the quantity of steam required by normal operation of the pump to pass through the ports and out of the discharge. In case the pump suction should unload and the pump commence to race, a much larger quantity of steam will pass momentarily through the valve 14 and this valve will thereupon be thrown upward against the spring tension until the faces 18 and 19 come into contact, thus completely stopping the flow of steam through the device and shutting down the pump. Thereafter the steam pressure against the lower side of the sliding valve will hold this valve in engagement with the seat 19 until the throttle valve 33 indicated in Fig. 2 is closed and steam pressure thus withdrawn. As soon as the steam in the pump cylinder has condensed the spring tension returns the sliding valve to its original position and the discharge is thereby opened, permitting renewed operation of the pump.

It will be obvious that the faces 18 and 19 may be tapered or curved instead of being flat as shown and that the proportion and the construction illustrated in the figures may be materially modified without in the least departing from the spirit of my invention. Also that by simple modification of the pipe connections my device may be placed in the live steam inlet to the pump instead of in the discharge outlet.

While I have described the use of my device in connection with steam pumps it will be understood that it is applicable without change to the control of pumps actuated by air, hydrocarbon gas or other gaseous material.

I claim as my invention:

An automatic stop for fluid actuated pumps, adapted to be placed in a fluid flow line in series with a pump, comprising in combination: a tubular fluid inlet means; a tubular valve fitted and reciprocating within said inlet tube; a disc closing the upper end of said tubular valve; ports through the circumferential wall of said tubular valve, said ports being covered by the wall of said tubular inlet when said valve is in retracted position; a hollow body enclosing said valve and said disc and communicating with said tubular inlet; a partition across said hollow body above said disc; a port through said partition and a seat adapted to cooperate with said disc formed around said port; an outlet for fluid from said hollow body above said partition; a stem attached to said disc and extending through said partition; resilient means cooperating with said stem and adapted to urge said disc away from said seat, and means external to said hollow body for adjusting the tension of said resilient means.

In witness that I claim the foregoing I have hereunto subscribed my name this 28 day of January, 1929.

HOWELL A. DENTON.